United States Patent [19]

Okuno et al.

[11] Patent Number: 4,672,256
[45] Date of Patent: Jun. 9, 1987

[54] LINEAR VIBRATION WAVE MOTOR

[75] Inventors: Takuo Okuno, Yokohama; Hiroyuki Seki, Sagamihara, both of Japan

[73] Assignee: Canon Kabushiki Kaisha, Tokyo, Japan

[21] Appl. No.: 812,070

[22] Filed: Dec. 23, 1985

[30] Foreign Application Priority Data

Dec. 26, 1984 [JP] Japan .................................. 59-276921

[51] Int. Cl.$^4$ .............................................. H01L 41/08
[52] U.S. Cl. ...................................... 310/323; 310/328
[58] Field of Search ............... 310/321, 323, 328, 12, 310/15

[56] References Cited

U.S. PATENT DOCUMENTS 4,484,099 11/1984 Kawai et al. .................... 310/328 X
4,495,432 1/1985 Katsuma et al. ..................... 310/328
4,562,373 12/1985 Tokusima et al. ................... 310/328
4,562,374 12/1985 Sashida ............................... 310/328

Primary Examiner—Mark O. Budd
Attorney, Agent, or Firm—Fitzpatrick, Cella, Harper & Scinto

[57] ABSTRACT

A vibration wave motor, in which a periodic voltage is applied to an electrostrictive element to generate a travelling vibration wave in the surface of a vibration member thereof, and in which a movable member having a friction member is driven on the vibration member by the vibration wave, includes a guide member for controlling the direction of displacement of the movable member, the guide member being disposed to prevent the movable member from being displaced in directions other than a predetermined direction of movement, and a flexible member connecting the movable member and the friction member.

10 Claims, 5 Drawing Figures

LINEAR VIBRATION WAVE MOTOR

BACKGROUND OF THE INVENTION

1. Field of the Invention

This invention relates to a linear vibration wave motor, and in particular to the structure thereof.

2. Description of the Prior Art

A vibration wave motor in which a travelling wave is generated in the surface of a vibration member having an electrostrictive element to thereby drive a movable member brought into contact with the vibration member is known from Japanese Laid-open Patent Application No. 148682/1983.

FIG. 1 of the accompanying drawings is a perspective view of a vibration wave motor for driving a movable member by a travelling wave generated in a vibration member, like the vibration wave motor disclosed in said patent application, and such motor has been proposed by the applicant.

The vibration wave motor shown in FIG. 1 is of the following structure. An electrostrictive element 4 is secured to an elliptical vibration member 1 supported by a support member 2 formed of felt or rubber, especially soft rubber. A periodic voltage is applied to the electrostrictive element to generate a wave in the vibration member, and a friction plate 9 is frictionally driven on the straight portion of the vibration member 1 by the travelling wave, whereby a movable member 3 connected to the friction plate 9 is driven in the directions of bilateral arrow through the friction plate 9.

However, the vibration wave motor shown in FIG. 1 is supported by the flexible support member 2 and therefore, the vibration member 1 is vibrated vertically and horizontally by the travelling wave generated in the vibration member 1 itself by the application of the voltage to the electrostrictive element. Alternatively when an extraneous force is applied to the driven movable member 3 for some reason or other, the movable member 3 vibrates vertically and horizontally because of the unstable support member 2, and this has led to a disadvantage that the movement locus of the movable member 3 does not exactly coincide with its predetermined locus and the movable member cannot be accurately driven.

SUMMARY OF THE INVENTION

It is an object of the present invention to eliminate the above-noted disadvantage peculiar to the prior art and to provide a vibration wave motor which can accurately drive a movable member, and under such an object, the present invention is characterized by the provision of a restraining member for preventing the movable member from moving along locuses other than the predetermined movement locus thereof.

It is another object of the present invention to provide shafts fitted in direct-acting bearings provided in the movable member as the restraining member for the movable member constituting the above-described linear vibration wave motor, thereby causing the movable member to be driven on the predetermined movement locus thereof.

It is still another object of the present invention to dispose a flexible member between a friction member frictionally contacting a vibration member constituting the linear vibration wave motor of the described type and the movable member to thereby improve the transmission of a travelling wave generated in the vibration member to the movable member.

Other objects of the present invention will become apparent from the following detailed description of some embodiments thereof taken in conjunction with the accompanying drawings.

DESCRIPTION OF THE PREFERRED EMBODIMENTS

Figure 1:
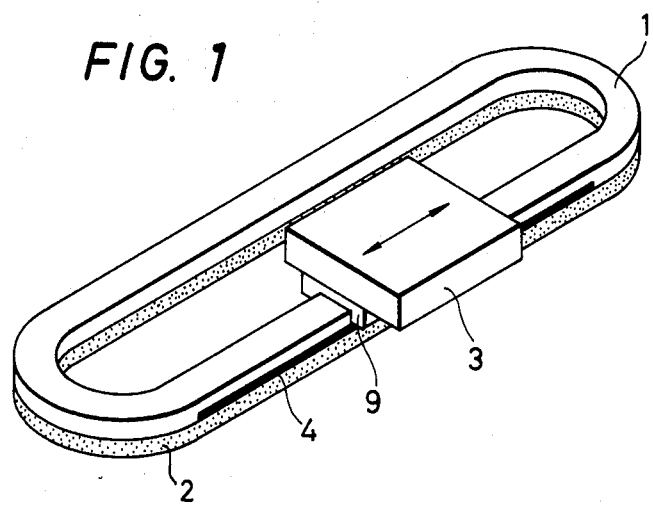
FIG. 1 is a perspective view of a vibration wave motor according to the prior art.
Figure 2:
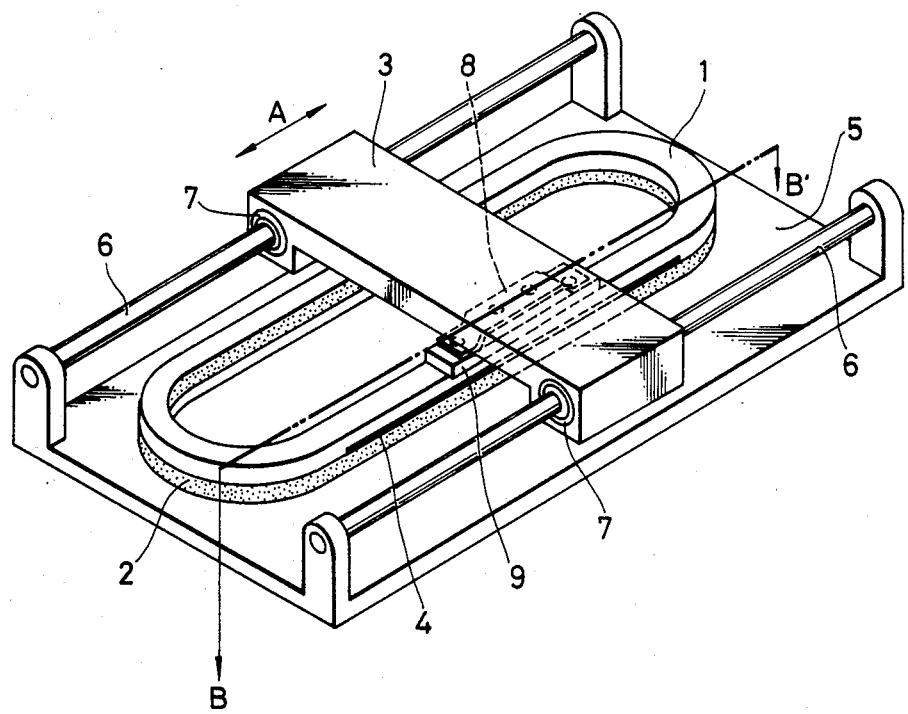
FIGS. 2 and 3 are a perspective view and a cross-sectional view, respectively, of a vibration wave motor according to a first embodiment of the present invention.
Figure 3:
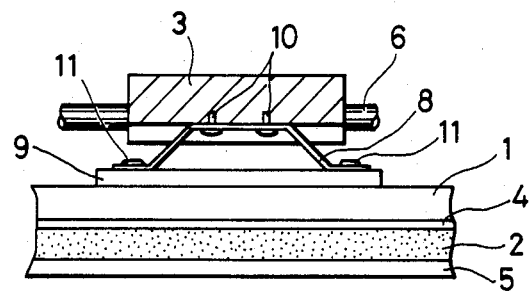

FIG. 2 is a perspective view of a vibration wave motor according to a first embodiment of the present invention, and FIG. 3 is a cross-sectional view taken along line B—B' of FIG. 2.

In FIGS. 2 and 3, a movable member 3 is held by direct-acting bearings 7 fitted on shafts 6 fixed to a base plate 5. Accordingly, the movable member 3 has a degree of freedom only in directions indicated by bilateral arrow A in FIG. 2. A plate spring 8 is secured to the underside of the movable member 3 by screws 10.

A friction plate 9 is secured to the plate spring 8 by screws 11. According to such a construction a vibration member 1 generates a travelling wave by an electrostrictive element 4 being driven, and even if the vibration member slides vertically and horizontally on a vibration absorbing member 2, such sliding movement is absorbed by the plate spring 8 and the movable member 3 is driven from the vibration member 1 only in the directions indicated by bilateral arrow A and thus, the movable member 3 can accurately effect rectilinear movement.

Also, according to the present embodiment, the plate spring 8 is provided between the movable member 3 and the friction plate 9 and therefore, even if the vibration member 1 vibrates, the friction plate 9 is always urged against the vibration member 1 by the plate spring 8 and particularly, both when a travelling wave is generated in the vibration member 1 and when the generation of the travelling wave is stopped, the surface contact between the friction plate 9 and the movable member 3 is always kept good and the driving force by the travelling wave of the vibration member 1 can be efficiently transmitted to the movable member 3.

Likewise, even if an extraneous force is applied to the movable member 3, the state of contact between the friction plate and the movable member is kept good, and even if a shock is applied to the movable member from outside, the shock can be absorbed by the plate spring 8.

Figure 4:
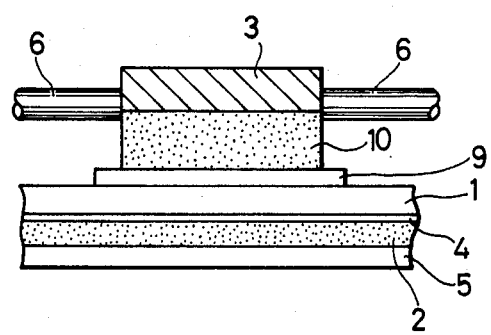
FIG. 4 is a cross-sectional view showing the essential portions of an embodiment in which rubber 10 is used instead of a plate spring 8 in the first embodiment.

FIG. 4 is a cross-sectional view similar to FIG. 3 but showing a vibration wave motor which is an embodiment in which rubber 10 is provided instead of the plate spring used in the first embodiment.

According to such an embodiment, the rubber 10 is provided instead of the plate spring and therefore, the function of absorbing a shock can be enhanced more than in the first embodiment. That is, the use of the rubber 10 leads to the possibility of absorbing a shock in any direction.

Thus, according to the present embodiment, the driving of the vibration wave motor can be made smoother and further, the plate spring need not be secured to the friction plate 9 and the movable member 3 by screws as is done in the first embodiment, but the rubber 10 may be adhesively secured thereto, and this leads to the possibility of reducing the number of manufacturing steps and accordingly the cost of manufacture.

Figure 5:
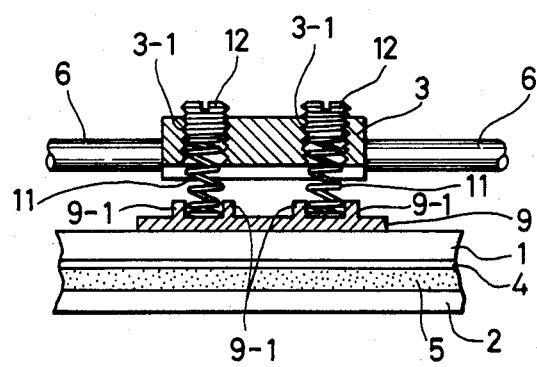
FIG. 5 is a cross-sectional view showing the essential portions of an embodiment in which coil springs are used instead of the plate spring 8 in the first embodiment shown in FIG. 3.

FIG. 5 is a cross-sectional view similar to FIG. 3 but showing a vibration wave motor which is an embodiment using coil springs as the flexible member such as the plate spring 8 in the first embodiment or the rubber 10 in the second embodiment. In the embodiment of FIG. 5, protrusions 9-1 are provided on the friction plate 9, one end of each of the coil spring 11 being fitted between the protrusions 9-1 and the other ends thereof being inserted into threaded holes 3-1 formed in the movable member 3, and further, adjusting screws 12 are threaded into the threaded holes 3-1.

Accordingly, the pressure force of the friction plate 9 and the vibration member 1 can be varied by turning the adjusting screws 12, whereby the friction force of the friction plate 9 and the vibration member 1 can be varied and the driving torque and driving speed of the vibration wave motor can be varied.

In the above-described embodiments, the vibration member is of an elliptical shape as shown in FIG. 2. However, this shape is not restrictive, the vibration member may be of any shape.

Also, in the present embodiment, the shafts 6 fitted in the direct-acting bearings 7 provided in the movable member 3 are provided as the restraining members for restraining the movable member so that it has a degree of freedom only in the directions of movement. Alternatively, the shafts may be replaced by members each having a groove in the directions of movement of the movable member 3 and fitted to the movable member 3 to so restrain the movement of the movable member. Other restraining methods also may be resorted to.

According to the present invention, as described above, the restraining members for restraining the displacement of the movable member in directions other than the predetermined direction of movement thereof are provided in the linear vibration wave motor and therefore, the movable member can be prevented from moving in a movement locus other than a predetermined movement locus and accurate driving of the linear vibration wave motor can be realized.

We claim:

1. A vibration wave motor in which an electrostrictive member is joined to a vibration member and a periodic voltage is applied to said electrostrictive member to thereby generate a travelling vibration wave in said vibration member and which has a movable member movable on said vibration member by the vibration wave generated in said vibration member, said motor comprising:
    a support member for supporting said vibration member on a base plate;
    a friction member integrally connected to said movable member, said friction member being in contact with said vibration member and transmitting thereto a driving force for driving said movable member on said vibration member by said vibration wave;
    a guide member disposed along said vibration member, said movable member being permitted to be displaced in a direction in which it is guided by said guide member; and
    wherein said vibration wave motor connects said movable member and said friction member together through a flexible member.

2. A vibration wave motor according to claim 1, wherein said flexible member is comprised of a spring member.

3. A vibration wave motor according to claim 1, wherein said flexible member is comprised of a rubber member.

4. A vibration wave motor in which an electrostrictive member is joined to a vibration member and a periodic voltage is applied to said electrostrictive member to thereby generate a travelling vibration wave in said vibration member and which has a movable member movable on said vibration member by the vibration wave generated in said vibration member, said motor comprising:
    a support member for supporting said vibration member on a base plate;
    a friction member integrally connected to said movable member, said friction member being in contact with said vibration member and transmitting thereto a driving force for driving said movable member on said vibration member by said vibration wave;
    a restraining member for retraining the displacement of said movable member is directions other than a predetermined direction of movement; and
    wherein said vibration wave motor connects said movable member and said friction member together through a flexible member.

5. A vibration wave motor in which an electrostrictive member is joined to a vibration member and a periodic voltage is applied to said electrostrictive member to thereby generate a travelling vibration wave in said vibration member and which has a movable member movable on said vibration member by the vibration wave generated in said vibration member, said motor comprising:
    a friction member integrally connected to said movable member, said friction member being in contact with said vibration member and transmitting thereto a driving force for driving said movable member on said vibration member by said vibration wave;
    a guide member disposed along said vibration member, said movable member being permitted to be displaced in a direction in which it is guided by said guide member; and
    wherein said vibration wave motor connects said movable member and said friction member together through a flexible member.

6. A vibration wave motor according to claim 5, wherein said flexible member is comprised of a rubber member.

7. A vibration wave motor in which an electrostrictive member is joined to a vibration member and a periodic voltage is applied to said electrostrictive member to thereby generate a travelling vibration wave in said vibration member and which has a movable member movable on said vibration member by the vibration wave generated in said vibration member, said motor comprising:

a friction member integrally connected to said movable member, said friction member being in contact with said vibration member and transmitting thereto a driving force for driving said movable member on said vibration member by said vibration wave;

a restraining member for restraining the displacement of said movable member in directions other than a predetermined direction of movement; and wherein said vibration wave motor connects said movable member and said friction member together through a flexible member.

8. A vibration wave motor according to claim 7, wherein said flexible member is comprised of a spring member.

9. A vibration wave motor in which an electrostrictive member is joined to a vibration member and a periodic voltage is applied to said electrostrictive member to thereby generate a travelling vibration wave in said vibration member and which has a movable member movable on said vibration member by the vibration wave generated in said vibration member, said motor comprising:

(a) a friction member integrally connected to said movable member, said friction member being in contact with said vibration member and transmitting thereto a driving force for driving said movable member on said vibration member by said vibration wave;

(b) a resilient member disposed between said friction member and said movable member; and (c) an adjusting member for adjusting the resilient force by said resilient member between said friction member and said movable member.

10. A vibration wave motor according to claim 9, wherein said resilient member is comprised of a spring member, said member is disposed between said friction member and a screw member threadably coupled to a threaded hole formed in said movable member, and said resilient force is adjusted by adjusting the amount of threadable coupling of said screw member.

* * * * *

UNITED STATES PATENT AND TRADEMARK OFFICE
CERTIFICATE OF CORRECTION

PATENT NO. : 4,672,256

DATED : June 9, 1987

INVENTOR(S) : TAKUO OKUNO, ET AL.

It is certified that error appears in the above-identified patent and that said Letters Patent is hereby corrected as shown below:

COLUMN 1

Line 37, "Alternatively when" should read
        --Alternatively, when--.

COLUMN 3

Line 32, "restrictive, the" should read
        --restrictive, and the--.

COLUMN 4

Line 32, "retraining" should read --restraining--.
    Line 33, "is" should read --in--.

COLUMN 6

Line 17, "said member" should read
        --said resilient member--.

Signed and Sealed this

Twenty-seventh Day of October, 1987

Attest:

DONALD J. QUIGG

*Attesting Officer*      *Commissioner of Patents and Trademarks*